(12) United States Patent
Le Cam et al.

(10) Patent No.: US 10,311,049 B2
(45) Date of Patent: Jun. 4, 2019

(54) PATTERN-BASED QUERY RESULT ENHANCEMENT

(71) Applicant: SAP SE, Walldorf (DE)

(72) Inventors: Stephane Le Cam, Verneuil sur Seine (FR); Xiaohui Xue, Courbevoie (FR); Pierre Saurel, Colombes (FR)

(73) Assignee: SAP SE, Waldorf (DE)

( * ) Notice: Subject to any disclaimer, the term of this patent is extended or adjusted under 35 U.S.C. 154(b) by 344 days.

(21) Appl. No.: 15/155,136

(22) Filed: May 16, 2016

(65) Prior Publication Data

US 2017/0329818 A1  Nov. 16, 2017

(51) Int. Cl.
*G06F 16/00* (2019.01)
*G06F 16/242* (2019.01)
*G06F 16/248* (2019.01)
*G06F 16/22* (2019.01)

(52) U.S. Cl.
CPC .......... *G06F 16/2425* (2019.01); *G06F 16/22* (2019.01); *G06F 16/248* (2019.01)

(58) Field of Classification Search
CPC ........ G06F 17/30554; G06F 17/30651; G06F 17/30672; G06F 17/3097; G06F 17/30973; G06F 17/30991; G06F 17/30994; G06F 16/283; G06F 16/248; G06F 16/24; G06F 16/2425; G06F 16/903

USPC ...................................................... 707/603
See application file for complete search history.

(56) References Cited

U.S. PATENT DOCUMENTS

| | | | |
|---|---|---|---|
| 8,024,666 B2 * | 9/2011 | Thompson | G06Q 10/00 345/440 |
| 9,665,662 B1 * | 5/2017 | Gautam | G06F 17/30964 |
| 2008/0082494 A1 * | 4/2008 | Polo-Malouvier | G06F 17/30398 |
| 2014/0337309 A1 * | 11/2014 | Thollot | G06F 17/30528 707/709 |
| 2015/0088808 A1 * | 3/2015 | Tyagi | G06F 17/30994 707/603 |
| 2015/0186806 A1 * | 7/2015 | Hiltz-Laforge | G06F 17/30572 705/7.11 |
| 2016/0371288 A1 * | 12/2016 | Le Biannic | G06F 17/30973 |
| 2018/0067998 A1 * | 3/2018 | Sherman | G06F 17/30554 |

* cited by examiner

*Primary Examiner* — Dennis Truong
(74) *Attorney, Agent, or Firm* — Buckley, Maschoff & Talwalkar LLC (57) ABSTRACT

A system includes reception of a first query, the first query comprising at least one of one or more dimensions and one or more measures, identification, in response to reception of the first query, of a first stored query set associated with the first query, the first stored query set comprising a plurality of queries, determination, in response to identification of the first stored query set, of a first plurality of result sets, each of the first plurality of result sets comprising a respective result set of the first query and each query of the plurality of queries, and presentation of a visualization of each of the first plurality of result sets.

15 Claims, 11 Drawing Sheets

PATTERN-BASED QUERY RESULT ENHANCEMENT

BACKGROUND

Enterprise software systems receive, generate, and store data related to many aspects of a business enterprise. This data may relate to sales, customer relationships, marketing, supplier relationships, inventory, human resources, and/or finances. Users operate reporting tools to access such data and display the data in useful formats, such as graphic visualizations.

Reporting tools may interact with a semantic layer defining a set of abstract entities known as business objects. Each business object associates one or more physical entities (e.g., a physical database table, associated columns of one or more database tables, etc.) of one or more enterprise data sources with user-friendly names. Business objects may be classified as dimensions, along which one may want to perform an analysis or report (e.g., Year, Country, Product), or measures (e.g., Sales, Profit), whose values can be determined for a given combination of dimension values.

Some conventional reporting tools receive user-submitted queries including dimensions and measures (e.g., Sales by Country), and present one or more visualizations (e.g., bar graph, pie chart, geo-chart) of a corresponding result set. It may be beneficial to display visualizations additional related result sets which may be of interest to the user. However, determination of appropriate queries and generation of such visualizations may require expertise and creativity which the user does not possess.

DETAILED DESCRIPTION

The following description is provided to enable any person in the art to make and use the described embodiments. Various modifications, however, will remain readily apparent to those in the art.

Figure 1:
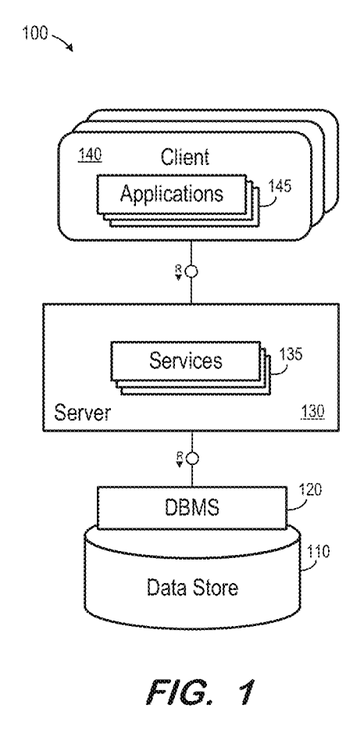
FIG. 1 is a block diagram of a system architecture according to some embodiments.

FIG. 1 is a block diagram of architecture 100 according to some embodiments. Embodiments are not limited to architecture 100 or to a database architecture.

Architecture 100 includes data store 110, database management system (DBMS) 120, server 130, services 135, clients 140 and applications 145. Generally, services 135 executing within server 130 receive requests from applications 145 executing on clients 140 and provides results to applications 145 based on data stored within data store 110.

More specifically, server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145, retrieving data from data store 110 based on the requests, processing the data received from data store 110, and providing the processed data to applications 145. Services 135 may be made available for execution by server 130 via registration and/or other procedures which are known in the art.

In one specific example, a client 140 executes an application 145 to present a user interface to a user on a display of the client 140. The user enters a query into the user interface consisting of one or more dimensions and/or one or more measures. The query may also include other information such as filters. The application passes a request based on the query to one of services 135. An SQL script is generated based on the request and forwarded to DBMS 120. DBMS 120 executes the SQL script to return a result set based on data of data store 110, and the application 145 creates a report/visualization based on the result set.

Server 130 provides any suitable protocol interfaces through which applications 145 executing on clients 140 may communicate with services 135 executing on application server 130. For example, server 130 may include a HyperText Transfer Protocol (HTTP) interface supporting a transient request/response protocol over Transmission Control Protocol (TCP), and/or a WebSocket interface supporting non-transient full-duplex communications between server 130 and any clients 140 which implement the WebSocket protocol over a single TCP connection.

One or more services 135 executing on server 130 may communicate with DBMS 120 using database management interfaces such as, but not limited to, Open Database Connectivity (ODBC) and Java Database Connectivity (JDBC) interfaces. These types of services 135 may use Structured Query Language (SQL) to manage and query data stored in data store 110.

DBMS 120 serves requests to query, retrieve, create, modify (update), and/or delete data of data store 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Server 130 may be separated from or closely integrated with DBMS 120. A closely-integrated server 130 may enable execution of services 135 completely on the database platform, without the need for an additional server. For example, according to some embodiments, server 130 provides a comprehensive set of embedded services which provide end-to-end support for Web-based applications. The services may include a lightweight web server, configurable support for Open Data Protocol, server-side JavaScript execution and access to SQL and SQLScript.

Server 130 may provide application services (e.g., via functional libraries) using which services 135 may manage and query the data of data store 110. The application services can be used to expose the database data model, with its tables, views and database procedures, to clients. In addition to exposing the data model, server 130 may host system services such as a search service.

Data store 110 may comprise any query-responsive data source or sources that are or become known, including but not limited to a structured-query language (SQL) relational database management system. Data store 110 may comprise a relational database, a multi-dimensional database, an eXtendable Markup Language (XML) document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

As described above, system 100 includes metadata defining business objects which are mapped to logical entities of data store 110. The metadata may include information regarding dimension names (e.g., Country, Year, Product), dimension hierarchies (e.g., Country>State>City), measure names (Profit, Units, Sales) and any other suitable metadata. According to some embodiments, and as will be described in detail below, the metadata include sets of queries associated with individual queries and/or query patterns. The metadata be stored in data store 110 and/or a separate repository (not shown).

Each of clients 140 may comprise one or more devices executing program code of an application 145 for presenting user interfaces to allow interaction with application server 130. The user interfaces of applications 145 may comprise user interfaces suited for reporting, data analysis, and/or any other functions based on the data of data store 110.

Presentation of a user interface as described herein may comprise any degree or type of rendering, depending on the type of user interface code generated by server 130. For example, a client 140 may execute a Web Browser to request and receive a Web page (e.g., in HTML format) from application server 130 via HTTP, HTTPS, and/or Web-Socket, and may render and present the Web page according to known protocols. One or more of clients 140 may also or alternatively present user interfaces by executing a stand-alone executable file (e.g., an .exe file) or code (e.g., a JAVA applet) within a virtual machine. In another method, one or more of clients 140 execute applications 145 loaded from server 130, that receive data and metadata by requests to services 135 executed on the server 130. Data and metadata is processed by the applications 145 to render the user interface on the client 140.

Figure 2A:
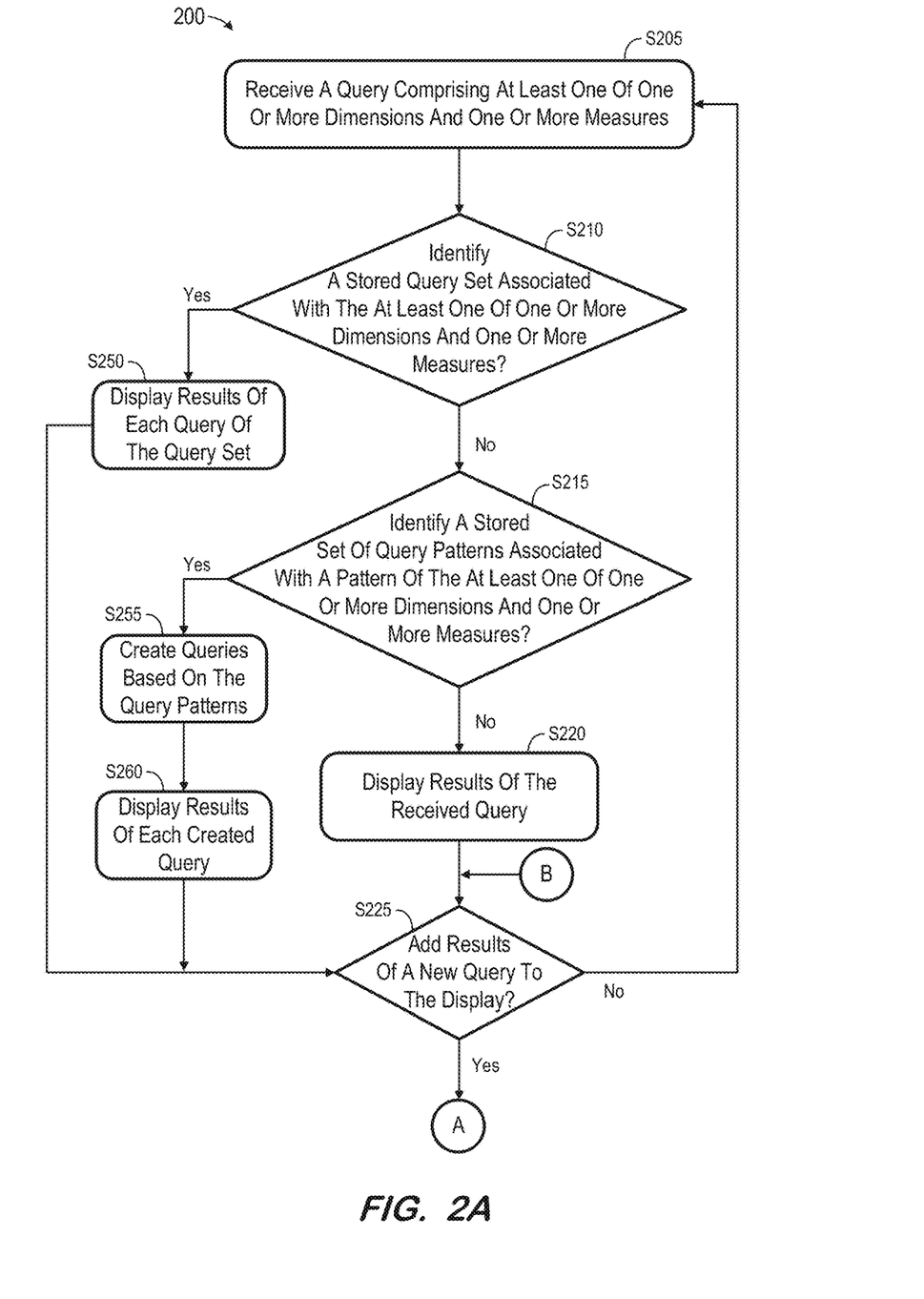
FIGS. 2A and 2B comprise a flow diagram of a process according to some embodiments.
Figure 2B:
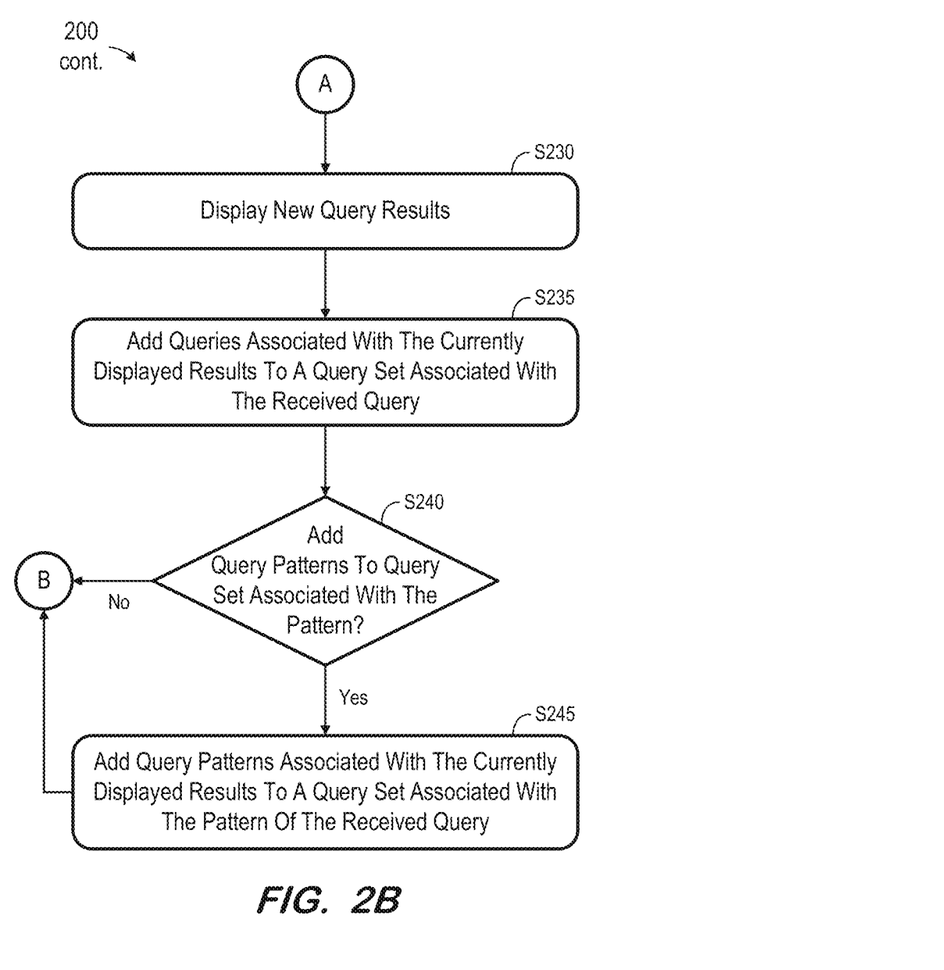

FIGS. 2A and 2B comprises a flow diagram of process 200 according to some embodiments. In some embodiments, various hardware elements of system 100 execute program code to perform process 200. Process 200 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 3:
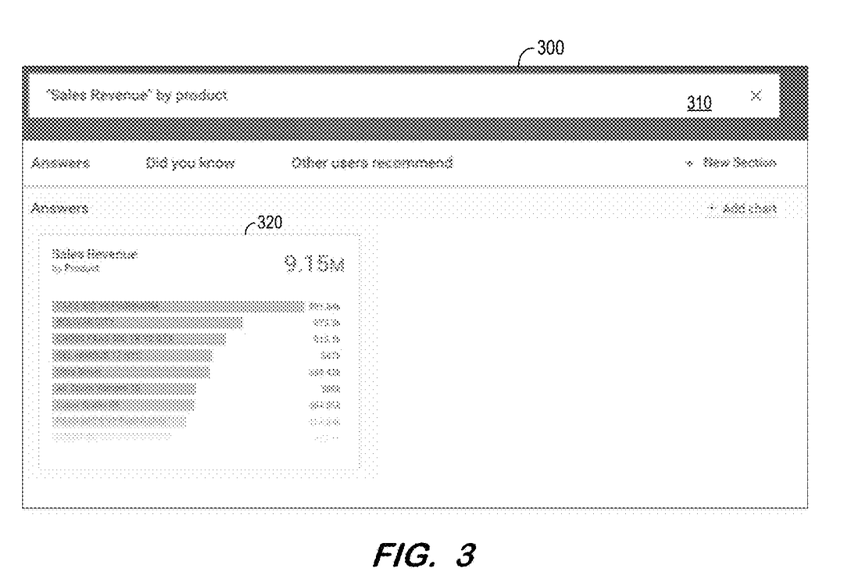
FIG. 3 is an outward view of a displayed user interface according to some embodiments.

Initially, at S205, a query is received comprising at least one of one or more dimensions and one or more measures. That is, the query includes at least one measure or dimension. FIG. 3 illustrates interface 300 to receive a query from a user according to some embodiments of S205. Interface 300 may comprise a Web page provided by server 130 in response to a request from a Web browser application 145 executing on client 140. Any client application 145 may be used to display interface 300, which is not limited to Web-based formats.

As shown, a user has entered the query "Sales Revenue" by product into input field 310. The query is received and flow continues to S210 to identify a stored query set associated with at least one of the one or more dimensions and the one or more measures of the received query. For purposes of the present example, no such query sets have been stored and flow therefore proceeds to S215. Similarly, S215 comprises an identification of a stored set of query patterns associated with a pattern of at least one of the one or more dimensions and the one or more measures of the received query. The pattern concept will be discussed in detail below. However, in the present example, flow continues to S220 because no query sets have yet been stored.

A default result of the received query is displayed at S220. Interface 300 shows results 320, comprising a bar graph showing sales revenue for each of several products. Results 320 may be generated using any suitable system for producing a visualization of a result set of data based on a query. As described above, and according to some embodiments, server 130 may generate an SQL script based on the query and on the metadata defining the dimensions and measures of the query, and forward the script to DBMS 120. DBMS 120 executes the SQL script to return a corresponding result set to an application 145 based on data of data store 110, and the application 145 creates a visualization (i.e., results 320) based on the result set. Results 320 comprise a bar graph but any other type of visualization may be employed according to some embodiments. Different types of visualizations may be designated as default visualizations for certain types of queries. In one example, a bar graph is a default visualization for displaying a result set of a query including a "<measure> by <dimension>" clause. In another example, a geo chart is a default visualization for queries including a geographical dimension.

Figure 4:
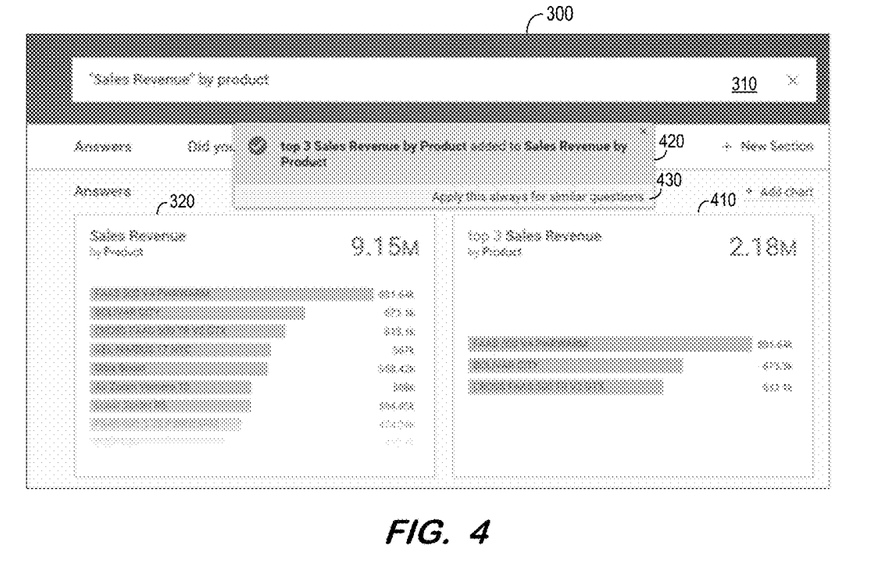
FIG. 4 is an outward view of a displayed user interface according to some embodiments.

Next, at S225, it is determined whether the user has input an instruction to add results of a new query to the display (i.e., in addition to the already-displayed results). If not, flow returns to S205 to receive another query. According to the present example, it will be assumed that the user selects the "+Add chart" control of interface 300 and a subsequently-displayed input field (not shown) to add results 410 of the query "Top 3 Sales Revenue by Product" to the display. Accordingly, flow continues to S230 to display the results of the new query as shown in FIG. 4 (i.e., results 410).

Figure 5:
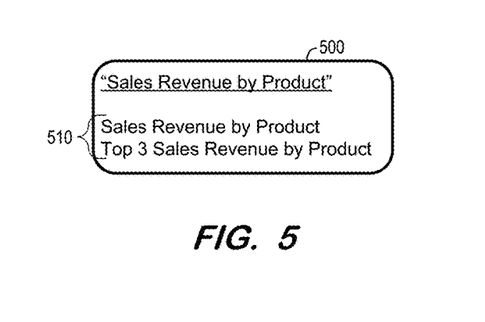
FIG. 5 illustrates a business brief definition according to some embodiments.

In response to the added results, the new query is added at S230 to a query set associated with the query which was received at S205. The data structure associating a query set with a query (or, as described below, with a query pattern) will be referred to herein as a "brief". FIG. 5 illustrates a representation of brief 500 generated at S235 according to some embodiments. Brief 500 is generated at S235 because no brief associated with the query "Sales Revenue" by Product has been previously created. Query set 510 of brief 500 includes the query with which brief 500 is associated (i.e., "Sales Revenue" by Product) and the query added at S235 (i.e., Top 3 "Sales Revenue" by Product).

Next, at S240, it is determined whether to add a new query to a query set associated with the pattern of the query which was originally received at S205. In this regard, user interface 300 displays dialog 420. Dialog 420 includes text indicating that the query added at S235 (i.e., Top 3 "Sales Revenue" by Product) has been added to the brief associated with the query "Sales Revenue" by Product. Dialog 420 also includes control 430, which may be selected to add the query which was added at S235 (i.e., Top 3 "Sales Revenue" by Product) to a brief associated with the pattern of the query which was initially received at S205.

It will be assumed that the user does not select control 430 but instead closes dialog 420 at S420. Flow therefore returns to S225, and then to S205 if the previously-described determination at S225 is negative (i.e., if the user does not add new results to the existing query). For example, the determination at S225 may be negative if the user closes interface 300 or enters a new query into field 310.

Figure 6:
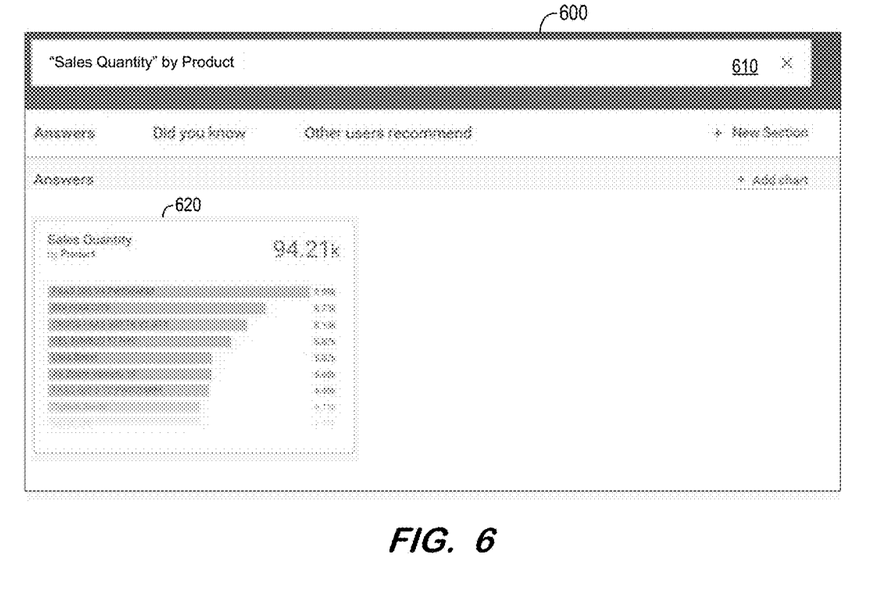
FIG. 6 is an outward view of a displayed user interface according to some embodiments.

FIG. 6 illustrates the entry of a new query into input field 610 of user interface 600 according to some embodiments. Interface 600 may be the same as interface 300 (i.e., displayed on the same display to the same user as the prior example) or may be displayed to another user and/or on a display of a different client 140. That is, process 200 may be executed with respect to more than one client 140, in parallel and/or at different times.

FIG. 6 illustrates reception of a next query (from a same or different user) at S205. The user has entered the query "Sales Quantity" by Product into input field 610. Next, at S210, an attempt is made to identify a stored query set associated with at least one of the one or more dimensions and the one or more measures of the received query. According to some embodiments, S210 checks for any brief which is associated with the identical query received at S205. Currently, the only stored brief is brief 500, which is associated with the query "Sales Revenue" by Product. Accordingly, flow continues to S215. In some embodiments, the identification of a stored query set at S210 may allow for some fuzzy matching between the received query and the queries associated with stored briefs.

No sets of query patterns have been stored in association with a query pattern, therefore flow continues from S215 to S220. FIG. 6 shows results 620 of the received query which are displayed at S220 as described above. It is then determined at S225 whether the user has input an instruction to add results of a new query to the display. Continuing the present example, it will be assumed that the determination at S225 may be negative and flow returns to S205.

Figure 7:
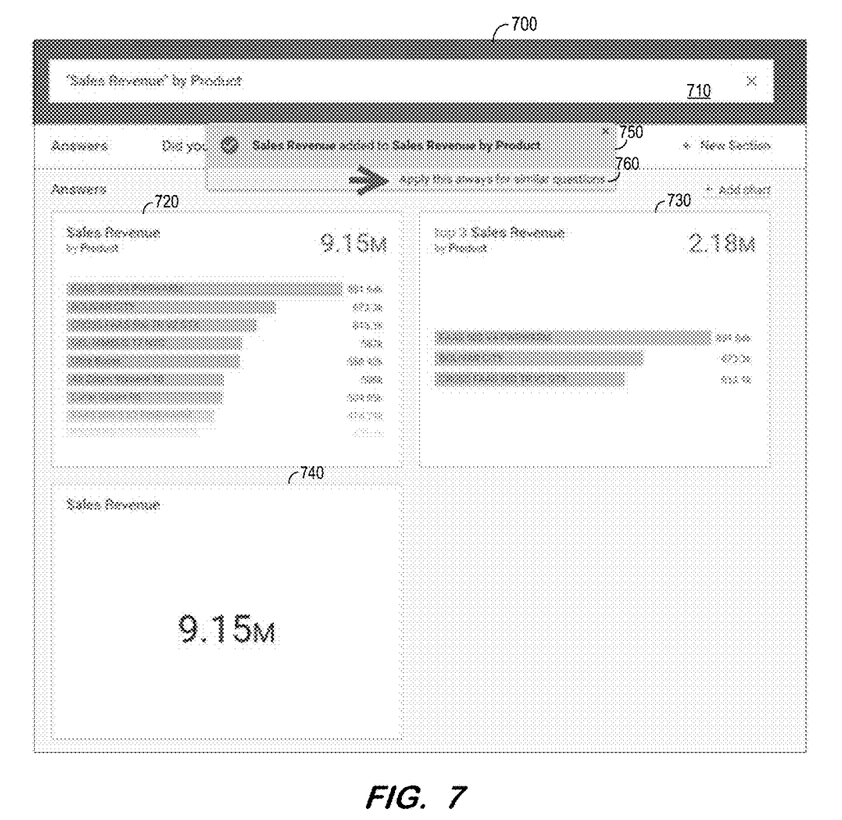
FIG. 7 is an outward view of a displayed user interface according to some embodiments.

FIG. 7 illustrates the entry of a new query into input field 710 of user interface 700 according to some embodiments. Interface 700 may be displayed to a same user as or different user than those previously described. The user has entered the query "Sales Revenue" by Product into input field 710. In response, at S210, brief 500 (i.e., a stored query set) is identified as being associated with (in this case, identical to) the received query. Flow therefore proceeds to S250 to display results of each query of the query set of brief 500. More specifically, and as shown in FIG. 7, entry of the query "Sales Revenue" by Product into input field 710 results in the display of result 720 (which is associated with the query Sales Revenue by Product of query set 510) and result 730 (which is associated with the query Top 3 Sales Revenue by Product of query set 510).

It is then determined at S225 whether the user has input an instruction to add results of a new query to the display. It will be assumed that the user manipulates interface 700 to add results of the query "Sales Revenue" to the display. Flow therefore continues to S230 to display results 740 of the new query.

Figure 8:
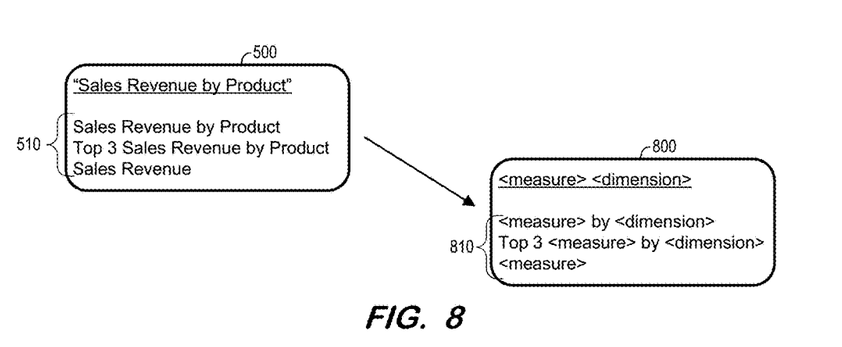
FIG. 8 illustrates business brief definitions according to some embodiments.

The new query (i.e., Sales Revenue) is added to query set 510 of brief 500 at S235 as shown in FIG. 8. Dialog 750 is also displayed to indicate that the query added at S235 (i.e., Sales Revenue) has been added to the brief associated with the query "Sales Revenue" by Product. Dialog 750 also includes control 760, which is selected at S240 to cause, at S245, the addition of the query which was added at S235 (i.e., Sales Revenue) to a brief associated with the pattern of the initially-received query (i.e., "Sales Revenue" by Product).

FIG. 8 illustrates brief 800 created at S245 according to the above example. Brief 800 associates a pattern (i.e., <measure> <dimension>) representing the initially-received query (i.e., "Sales Revenue" by Product) with a set of query patterns 810 representing each of the results currently displayed in user interface 700. The query patterns of set 810 are query patterns of each query for which is a result is displayed in user interface 710. More specifically, result 720 corresponds to the query "Sales Revenue" by Product, which is represented by the query pattern "<measure> by <dimension>" in query set 810, result 730 corresponds to the query Top 3 "Sales Revenue" by Product, which is represented by the query pattern "Top 3 <measure> by <dimension>" in query set 810, and result 740 corresponds to the query "Sales Revenue", which is represented by the query pattern <measure> in query set 810.

The pattern of a query may comprise any representation of the query. The pattern may describe the query as well as one or more other queries. In some embodiments, a specific measure or dimension of a query is represented as <measure> or <dimension>, respectively, in the pattern of the query. With respect to the current example, the pattern of the query "Sales Revenue" by Product may be <measure> <dimension> according to some embodiments. Other wildcards may be used to represent other query elements. For example, <Gdimension> may represent geographic dimensions (e.g., region).

Flow then returns to S225. It will be assumed that the user does not add new results to the existing query and therefore flow returns to S205.

Figure 9:
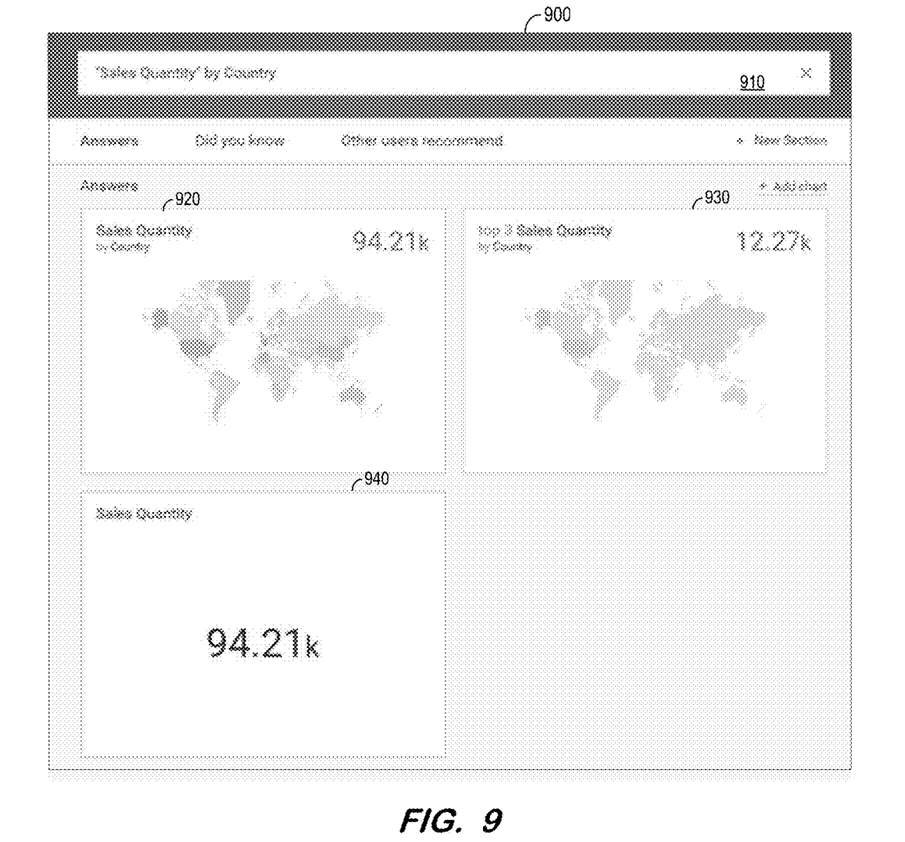
FIG. 9 is an outward view of a displayed user interface according to some embodiments.

FIG. 9 illustrates the entry of a new query into input field 910 of user interface 900 according to some embodiments. Again, interface 900 may be displayed to a same user as or different user than those previously described. The user has entered the query "Sales Quantity" by Country into input field 910.

At S210, no stored query set is identified as associated with the dimensions (i.e., Country) and measures (i.e., "Sales Quantity") of the query. In this regard, brief 500 is associated with the query "Sales Revenue" by product and therefore is not associated with the input query of field 910.

Next, at S215, the system attempts to identify a stored set of query patterns associated with a pattern of the at least one of the one or more dimensions and measures of the input query. In the present example, the input query (i.e., "Sales Quantity" by Country) matches the pattern (i.e., <measure> <dimension>) of brief 800. Accordingly, set 810 of brief 800 is identified at S215. Flow then proceeds to S255.

At S255, the pattern wildcards <measure> and <dimension> of each query pattern of set 810 are replaced with the actual dimension (i.e., "Sales Quantity") and measure (i.e., Country) of the input query to create a set of queries. Next, at S260, the queries are executed and their results are displayed. As shown in FIG. 9, entry of the query "Sales Quantity" by Country into input field 910 results in the display of result 920 (which are results corresponding to the query pattern <measure> by <dimension> of query set 810), result 930 (which are results corresponding to the query pattern Top 3 <measure> by <dimension> of query set 810), and result 940 (which are results corresponding to the query pattern <measure> of query set 810).

Flow then continues to S225. It will be assumed that the user does not add new results to the existing query of input field 910 and therefore flow returns to S205.

Figure 10:
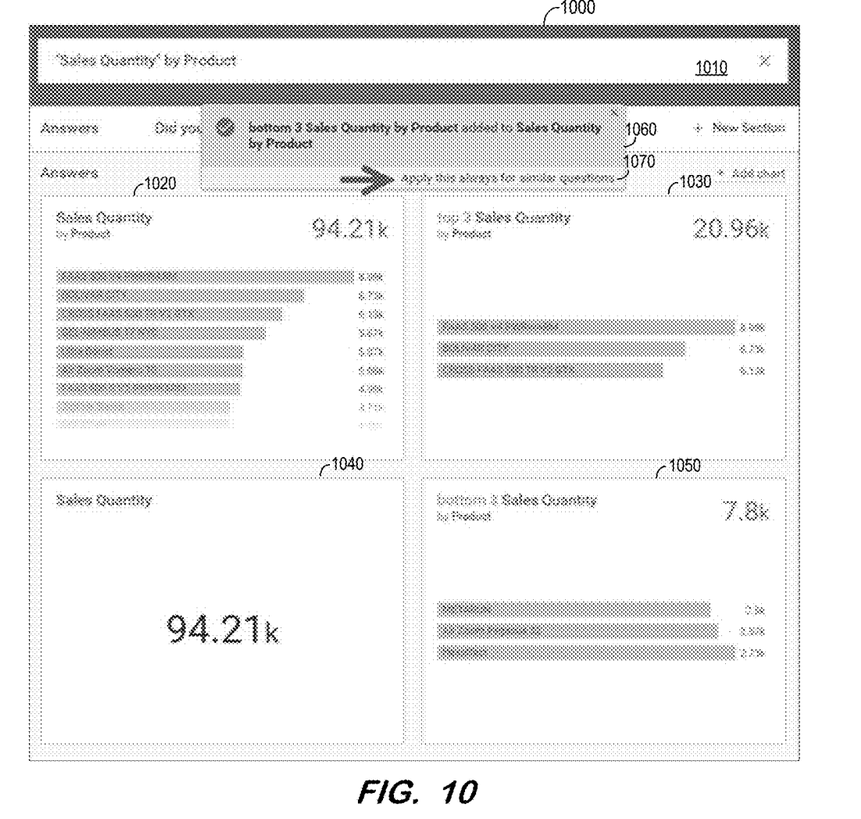
FIG. 10 is an outward view of a displayed user interface according to some embodiments.

FIG. 10 illustrates the entry of a new query into input field 1010 of user interface 1000 according to some embodiments. Interface 1000 may be displayed to a same user as or different user than those previously described. As shown, the user has entered the query "Sales Quantity" by Product into input field 1010.

At S210, no stored query set is identified as associated with the dimensions (i.e., Product) and measures (i.e., "Sales Quantity") of the query. Next, at S215, it is determined that the input query (i.e., "Sales Quantity" by Product) matches the pattern (i.e., <measure> <dimension>) of brief 800. Accordingly, query pattern set 810 of brief 800 is again identified at S215. As described above, flow proceeds to S255 to generate queries in which the pattern wildcards <measure> and <dimension> of each query pattern of query set 810 are replaced with the dimension (i.e., "Sales Quantity") and measure (i.e., Product) of the input query of field 1010. Results of each created query are displayed at S260.

Entry of the query "Sales Quantity" by Product into input field 1010 therefore results in the display of result 1020 (which are results corresponding to the query pattern <measure> by <dimension> of query set 810), result 1030 (which are results corresponding to the query pattern Top 3 <measure> by <dimension> of query set 810), and result 1040 (which are results corresponding to the query pattern <measure> of query set 810).

It is then determined at S225 whether the user has input an instruction to add results of a new query to the display. It will be assumed that the user manipulates the "+Add chart" control of interface 1000 to add results of the query Bottom 3 "Sales Quantity" by Product to the display. Flow therefore continues to S230 to display results 1050 of the new query.

Figure 11:
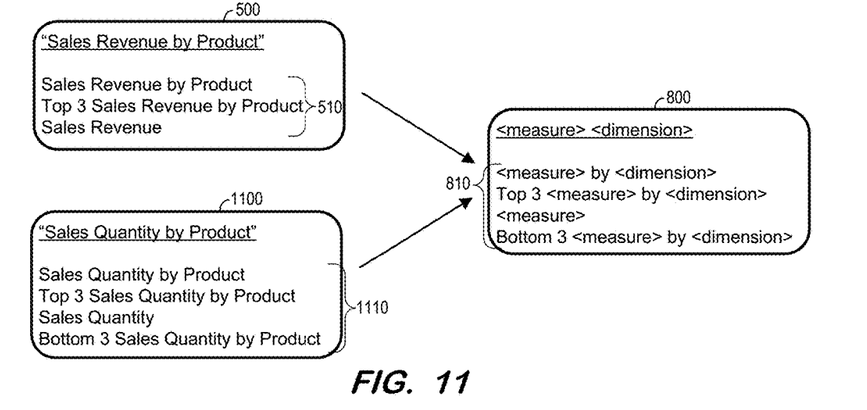
FIG. 11 illustrates business brief definitions according to some embodiments.

The new query (i.e., Bottom 3 "Sales Quantity" by Product) is added to a query set associated with the input query (i.e., "Sales Quantity" by Product) at S235. As shown in FIG. 11, brief 1100 is generated at S235 because no brief associated with the query "Sales Quantity" by Product has been previously created. Query set 1110 of brief 1100 is generated to include the query with which brief 1100 is associated (i.e., "Sales Quantity" by Product), and the queries associated with the other currently-displayed results 1030, 1040, and the query added at S235 (i.e., Bottom 3 "Sales Quantity" by Product).

Next, at S240, it is determined whether to add a new query pattern to a set of query patterns associated with the pattern of the query which was originally received at S205. User interface 1000 displays dialog 1060 including text indicating that the query added at S235 (i.e., Bottom 3 "Sales Quantity" by Product) has been added to the brief associated with the query "Sales Quantity" by Product (i.e., brief 1100). Dialog 1060 also includes control 1070, which is selected to add a pattern corresponding to the query which was added at S235 (i.e., Bottom 3 "Sales Quantity" by Product) to a brief associated with the pattern of the query which was initially received at S205 (i.e., "Sales Quantity" by Product).

The pattern of the initially-received query (i.e., "Sales Quantity" by Product) is determined to be <measure> <dimension> according to the present example. Previously-generated brief 800 is associated with this pattern, therefore S245 comprises adding a query pattern corresponding to each displayed result to brief 800. Brief 800 already includes patterns associated with results 920, 930 and 940. S245 therefore comprises adding the query pattern "Bottom 3 <measure> by <dimension>" to set 810, as shown in FIG. 11.

Figure 12:
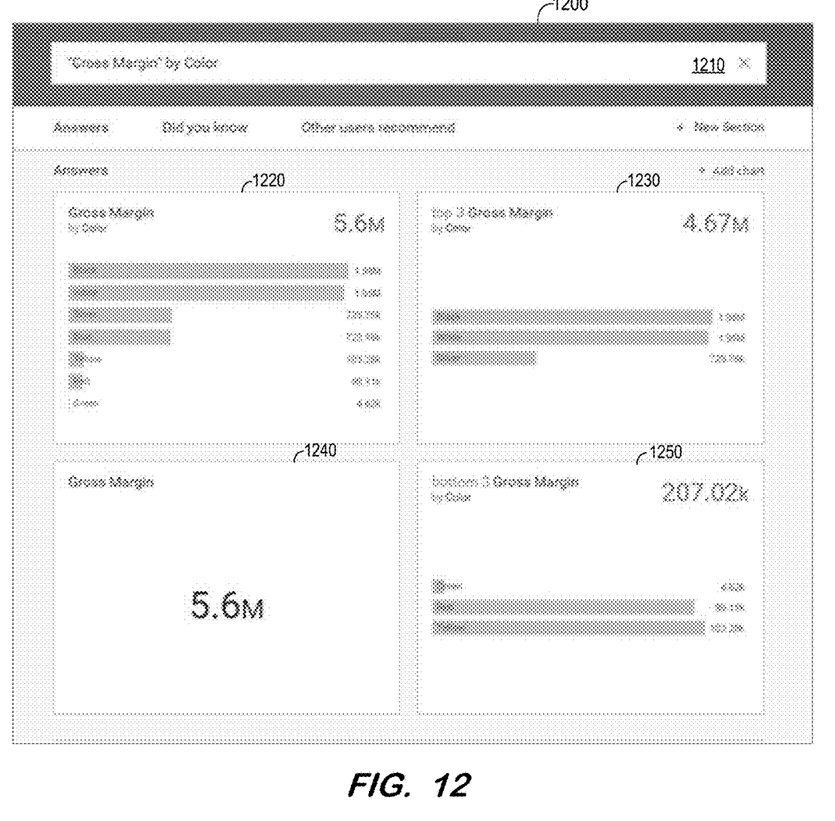
FIG. 12 is an outward view of a displayed user interface according to some embodiments.

FIG. 12 illustrates the entry of a new query into input field 1210 of user interface 1200 according to some embodiments. Again, interface 1200 may be displayed to a same user as or different user than those previously described. The user has entered the query "Gross Margin" by Color into input field 1210.

At S210, no stored query set is identified as associated with the dimensions (i.e., Color) and measures (i.e., "Gross Margin") of the query. More specifically, brief 500 is associated with the query "Sales Revenue" by product, and brief 1100 is associated with the query "Sales Quantity" by product. Therefore, neither brief 500 nor brief 1100 is associated with the input query of field 1210.

Next, at S215, it is determined that the input query (i.e., "Gross Margin" by Color) matches the pattern (i.e., <measure> <dimension>) of brief 800. Accordingly, query pattern set 810 of brief 800, as shown in FIG. 11, is identified at S215. Flow then proceeds to S255 to create a query for each query pattern of set 810. In particular, the pattern wildcards <measure> and <dimension> of each query pattern of set 810 are replaced with the actual dimension (i.e., "Gross Margin") and measure (i.e., Color) of the input query prior to execution thereof.

The results of each created query are displayed at S260. As shown in FIG. 12, entry of the query "Gross Margin" by Color into input field 1210 results in the display of result 1220 (which are results corresponding to the query pattern <measure> by <dimension> of query set 810), result 1230 (which are results corresponding to the query pattern Top 3 <measure> by <dimension> of query set 810), result 1240 (which are results corresponding to the query pattern <measure> of query set 810), and result 1250 (which are results corresponding to the query pattern Bottom 3 <measure> by <dimension> of query set 810).

According to some embodiments, the actions of one user which result in the addition of queries to briefs as described above will affect the query results displayed to other users. By virtue of some embodiments of process 200, queries received from more than one user may be used to create a collection of briefs which are in turn used to determine query results to display to all (or a subset of several) users. In some embodiments, users belonging to a particular department or business division share a common set of briefs which are used to determine the results displayed in response to an input query.

Figure 13:
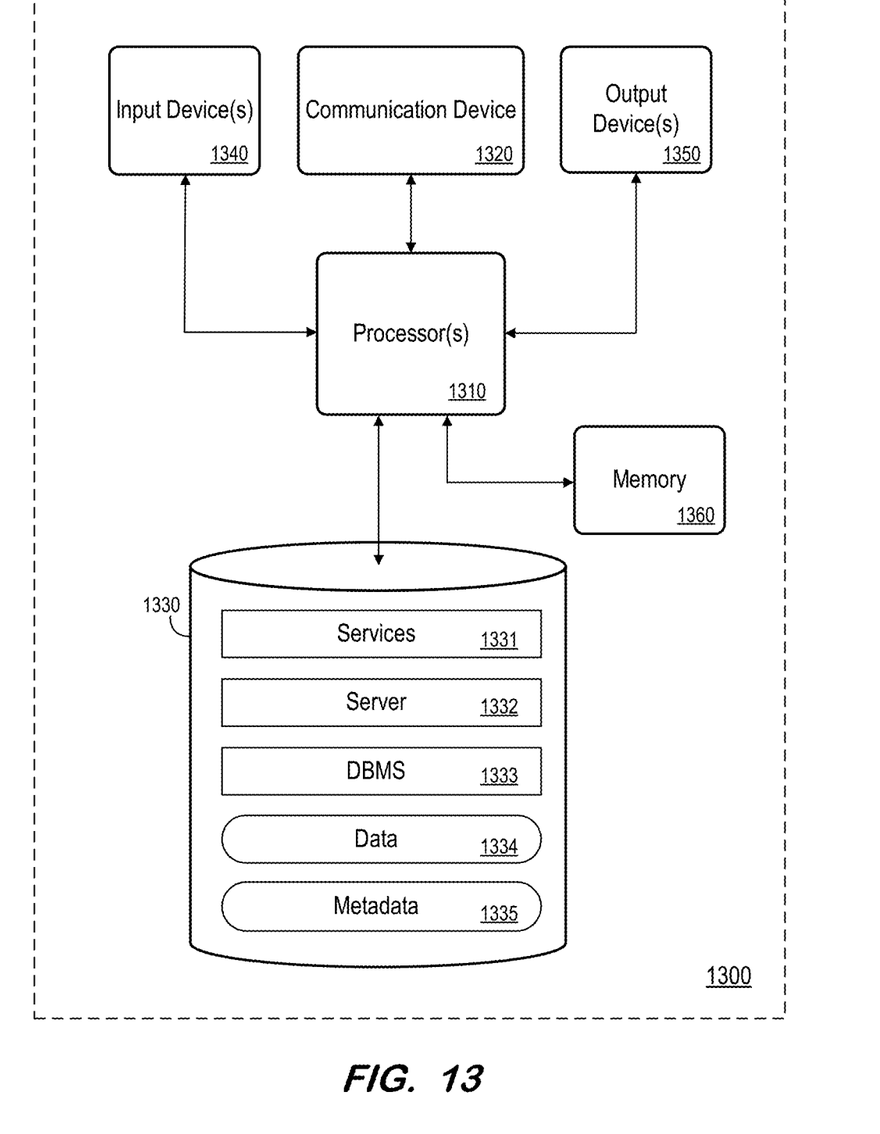
FIG. 13 is a block diagram of an apparatus according to some embodiments.

FIG. 13 is a block diagram of apparatus 1300 according to some embodiments. Apparatus 1300 may comprise a general-purpose computing apparatus and may execute program code to perform any of the functions described herein. Apparatus 1300 may comprise an implementation of server 130, DBMS 120 and data store 110 of FIG. 1 in some embodiments. Apparatus 1300 may include other unshown elements according to some embodiments.

Apparatus 1300 includes processor 1310 operatively coupled to communication device 1320, data storage device 1330, one or more input devices 1340, one or more output devices 1350 and memory 1360. Communication device 1320 may facilitate communication with external devices, such as a reporting client, or a data storage device. Input device(s) 1340 may comprise, for example, a keyboard, a keypad, a mouse or other pointing device, a microphone, knob or a switch, an infra-red (IR) port, a docking station, and/or a touch screen. Input device(s) 1340 may be used, for example, to enter information into apparatus 1300. Output device(s) 1350 may comprise, for example, a display (e.g., a display screen) a speaker, and/or a printer.

Data storage device 1330 may comprise any appropriate persistent storage device, including combinations of magnetic storage devices (e.g., magnetic tape, hard disk drives and flash memory), optical storage devices, Read Only Memory (ROM) devices, etc., while memory 1360 may comprise Random Access Memory (RAM), Storage Class Memory (SCM) or any other fast-access memory.

Services 1331, server 1332 and DBMS 1333 may comprise program code executed by processor 1310 to cause apparatus 1300 to perform any one or more of the processes described herein. Embodiments are not limited to execution of these processes by a single apparatus.

Data 1334 and metadata 1335 (either cached or a full database) may be stored in volatile memory such as memory 1360. Metadata 1335 may include information regarding dimension names, dimension hierarchies, measure names, and sets of queries associated with individual queries and/or query patterns. Data storage device 1330 may also store data and other program code for providing additional functionality and/or which are necessary for operation of apparatus 1300, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable process steps; and
a processor to execute the processor-executable process steps to cause the system to:
receive a first query, the first query comprising at least one of one or more dimensions and one or more measures of data of a data store;
in response to reception of the first query, identify whether a first stored query set includes a query matching the first query, the first stored query set comprising a plurality of queries;
in response to identification of the first stored query set, determine a first plurality of query result sets, each of the first plurality of query result sets comprising a respective: result set based on an execution of the first query, an execution of each query of the plurality of queries of the first stored query set, and metadata defining the first query and the plurality of queries of the first stored query set;
in response to reception of the first query, identify whether a first stored set of query patterns includes a query pattern matching a pattern of the at least one of one or more dimensions and one or more measures of the first query;
in response to identification of the first stored set of query patterns, determine a second plurality of queries based on the identified stored set of query patterns and on the one or more dimensions and one or more measures of the first query;
determine a second plurality of query result sets based on an execution of the second plurality of queries and metadata defining measures and dimensions of the second plurality of queries, each of the second plurality of query result sets comprising a result set of each of the identified stored set of query patterns where measures and dimensions of the identified stored set of query patterns are replaced with the at least one of one or more dimensions and one or more measures of the first query; and
present a visualization of each of the determined first plurality of query result sets and second plurality of query result sets.

2. A system according to claim 1, the processor to further execute the processor-executable process steps to cause the system to:
receive an instruction to present an added visualization of an added query result set associated with a second query with the presented visualizations of each of the first plurality of query result sets;
present the added visualization of the added query result set; and
add the second query to the first stored query set.

3. A system according to claim 2, the processor to further execute the processor-executable process steps to cause the system to:

receive a third query, the third query identical to the first query;
in response to reception of the third query, identify the first stored query set, the first stored query set comprising the plurality of queries of the first stored query set and the second query;
determine a third plurality of query result sets, each of the third plurality of query result sets comprising a respective: result set based on an execution of each of the second query, the third query, the plurality of queries of the first stored query set and metadata defining the second query, the third query, and the plurality of queries of the first stored query set; and
present a visualization of each of the third plurality of query result sets.

4. A system according to claim 2, the processor to further execute the processor-executable process steps to cause the system to:
receive a second instruction to generate a set of queries associated with a pattern of the first query;
in response to the second instruction, determine a query pattern for each of the first query, the second query and the plurality of queries; and
store the query patterns in association with the pattern of the first query.

5. A system according to claim 1, the processor to further execute the processor-executable process steps to cause the system to:
receive an instruction to generate a set of queries associated with a pattern of the first query;
in response to the second instruction, determine a query pattern for each of the first query and the plurality of queries of the first stored query set; and
store the query patterns in association with the pattern of the first query.

6. A computer-implemented method comprising:
receiving a first query, the first query comprising at least one of one or more dimensions and one or more measures of data of a data store;
in response to reception of the first query, identifying whether a first stored query set includes a query matching the first query, the first stored query set comprising a plurality of queries;
in response to identification of the first stored query set, determining a first plurality of query result sets, each of the first plurality of query result sets comprising a respective: result set ef based on an execution of the first query, an execution of each query of the plurality of queries of the first stored query set, and metadata defining the first query and the plurality of queries of the first stored query set;
in response to reception of the first query, identifying whether a first stored set of query patterns includes a query pattern matching a pattern of the at least one of one or more dimensions and one or more measures of the first query;
in response to identification of the first stored set of query patterns, determining a second plurality of queries based on the identified stored set of query patterns and on the one or more dimensions and one or more measures of the first query;
determining a second plurality of query result sets based on an execution of the second plurality of queries and metadata defining measures and dimensions of the second plurality of queries, each of the second plurality of query result sets comprising a result set of each of the identified stored set of query patterns where measures and dimensions of the identified stored set of query patterns are replaced with the at least one of one or more dimensions and one or more measures of the first query; and
presenting a visualization of each of the determined first plurality of query result sets and second plurality of query result sets.

7. A method according to claim 6, further comprising:
receiving an instruction to present an added visualization of an added query result set associated with a second query with the presented visualizations of each of the first plurality of query result sets;
presenting the added visualization of the added query result set; and
adding the second query to the first stored query set.

8. A method according to claim 7, further comprising:
receiving a third query, the third query identical to the first query;
in response to reception of the third query, identifying the first stored query set, the first stored query set comprising the plurality of queries of the first stored query set and the second query;
determining a third plurality of query result sets, each of the third plurality of query result sets comprising a respective: result set based on an execution of each of the second query, the third query and the plurality of queries of the first stored query set, and metadata defining the second query, the third query, and the plurality of queries of the first stored query set; and
presenting a visualization of each of the third plurality of query result sets.

9. A method according to claim 7, further comprising:
receiving a second instruction to generate a set of queries associated with a pattern of the first query;
in response to the second instruction, determining a query pattern for each of the first query, the second query and the plurality of queries of the first stored query set; and
storing the query patterns in association with the pattern of the first query.

10. A method according to claim 6, further comprising:
receiving an instruction to generate a set of queries associated with a pattern of the first query;
in response to the instruction, determining a query pattern for the first query and the plurality of queries of the first stored query set; and
storing the query patterns in association with the pattern of the first query.

11. A non-transitory computer-readable medium storing program code, the program code executable by a processor of a computing system to cause the computing system to:
receive a first query, the first query comprising at least one of one or more dimensions and one or more measures of data of a data store;
in response to reception of the first query, identify whether a first stored query set includes a query matching the first query, the first stored query set comprising a plurality of queries;
in response to identification of the first stored query set, determine a first plurality of query result sets, each of the first plurality of query result sets comprising a respective: result set based on an execution of the first query, an execution of each query of the plurality of queries of the first stored query set, and metadata defining the first query and the plurality of queries of the first stored query set;
in response to reception of the first query, identify whether a first stored set of query patterns includes a query pattern matching a pattern of the at least one of one or more dimensions and one or more measures of the first query;

in response to identification of the first stored set of query patterns, determine a second plurality of queries based on the identified stored set of query patterns and on the one or more dimensions and one or more measures of the first query;

determine a second plurality of query result sets based on an execution of the second plurality of queries and metadata defining measures and dimensions of the second plurality of queries, each of the second plurality of query result sets comprising a result set of each of the identified stored set of query patterns where measures and dimensions of the identified stored set of query patterns are replaced with the at least one of one or more dimensions and one or more measures of the first query; and present a visualization of each of the determined first plurality of query result sets and second plurality of query result sets.

12. A non-transitory computer-readable medium according to claim 11, the program code further executable by a processor of the computing system to cause the computing system to:

receive an instruction to present an added visualization of an added query result set associated with a second query with the presented visualizations of each of the first plurality of query result sets;

present the added visualization of the added result set; and add the second query to the first stored query set.

13. A non-transitory computer-readable medium according to claim 12, the program code further executable by a processor of the computing system to cause the computing system to:

receive a third query, the third query identical to the first query;

in response to reception of the third query, identify the first stored query set, the first stored query set comprising the plurality of queries and the second query;

determine a third plurality of query result sets, each of the third plurality of query result sets comprising a respective: result set based on an execution of each of the second query, the third query and the plurality of queries of the first stored query set and metadata defining the second query, the third query, and the plurality of queries of the first stored query set; and present a visualization of each of the third plurality of query result sets.

14. A non-transitory computer-readable medium according to claim 12, the program code further executable by a processor of the computing system to cause the computing system to:

receive a second instruction to generate a set of queries associated with a pattern of the first query;

in response to the second instruction, determine a query pattern for each of the first query, the second query and the plurality of queries of the first stored query set; and store the query patterns in association with the pattern of the first query.

15. A non-transitory computer-readable medium according to claim 11, the program code further executable by a processor of the computing system to cause the computing system to:

receive an instruction to generate a set of queries associated with a pattern of the first query;

in response to the second instruction, determine a query pattern for each of the first query and the plurality of queries of the first stored query set;

store the query patterns in association with the pattern of the first query;

receive a third query comprising at least one of a second one or more dimensions and a second one or more measures;

determine that the third query matches the pattern of the first query;

in response to the determination that the third query matches the pattern of the first query of the third query, identify the query patterns stored in association with the pattern of the first query;

determine a second plurality of queries based on the identified query patterns and on the second one or more dimensions and second one or more measures of the third query;

determine a second plurality of query result sets, each of the second plurality of query result sets comprising a respective: result set of each of the second plurality of queries and the third query; and present a visualization of each of the second plurality of query result sets.

* * * * *